United States Patent [19]

Stuchl

[11] 4,304,086
[45] Dec. 8, 1981

[54] LAWN MOWER ATTACHMENT FOR SMALL TRACTORS

[76] Inventor: Ronald J. Stuchl, 1705 Park Dr., Schaumburg, Ill. 60194

[21] Appl. No.: 69,891

[22] Filed: Aug. 27, 1979

[51] Int. Cl.³ .............................................. A01D 75/30
[52] U.S. Cl. .......................................... 56/6; 56/13.5; 56/17.1; 280/443
[58] Field of Search ...................... 56/6, 7, 13.5, 17.1; 74/496; 280/443, 444, 445

[56] References Cited

U.S. PATENT DOCUMENTS

| | | | |
|---|---|---|---|
| 2,579,118 | 12/1951 | Land | 280/443 |
| 3,329,225 | 7/1967 | Dunn | 56/6 |
| 3,514,126 | 5/1970 | Fuss | 56/6 |
| 3,608,284 | 9/1971 | Erdman | 56/6 |
| 3,717,981 | 2/1973 | Lely | 56/6 |
| 4,135,349 | 1/1979 | Schwertner | 56/6 |

*Primary Examiner*—Robert A. Hafer

[57] ABSTRACT

An independently powered mowing attachment for small or medium sized lawn and garden tractors of the low profile type having a rotary mower mounted on the underside of the tractor frame. The attachment has spaced mower assemblies that cut swaths on both sides of the tractor mowers central cut. The mower attachment includes a frame pivotally connected to the tractor drawbar having rear wheels that steer as the tractor turns to assure that the mower assemblies follow and overlap the swath of the leading tractor mounted mower.

Each mower assembly is pivotally mounted about a horizontal axis at one side of the attachment frame and has three rotary cutting blades driven by an internal combustion engine mounted centrally on the frame. Two hydraulic actuators are provided for raising and lowering the mower assemblies either simultaneously prior to transport and use, or independently when an obstruction is encountered on one side of the cutting path.

The attachment mounted engine also drives a hydrostatic drive that is used to rotate the blades in the tractor mounted mower to remove the mower blade as a load on the tractor engine.

16 Claims, 6 Drawing Figures

LAWN MOWER ATTACHMENT FOR SMALL TRACTORS

BACKGROUND OF THE PRESENT INVENTION

In recent years, smaller versions of farm-type tractors have found increasing popularity for use as rideable power vehicles to mow commercial as well as residential grassed areas. These tractors are generally characterized as low profile tractors since the seat upon which the operator rides may be reached without climbing the tractor frame.

Presently these tractors have between six (6) to twenty (20) horsepower motors although low profile tractors having somewhat greater horsepower ratings are presently being designed. One type of mower attachment for tractors of this type includes a three-bladed mower assembly that is mounted under the tractor frame between the front and the rear wheels. A mechanical or hydraulic mechanism is provided for raising and lowering this mower unit and it is powered by a mechanical drive from the tractor engine. This type of mower attachment has been found very successful because of its durability and ease of sharpening when compared to the older reel-type mowers. Because of the size of the tractor, however, these mowers have a limited cutting width that directly adversely affects the cutting time and cost in commercial grass cutting operations.

Rotary-type mowers have also been used mounted behind the larger farm-type tractors for mowing the rights-of-way found along many of the highways of this country. These mowers generally ride behind the tractor and may be raised or lowered by a suitable actuator. This mower when reduced in size to match the low profile smaller tractors would have the same very limited cutting width of the under the tractor frame mowing attachment described above.

A well known technique for increasing the cutting width of a mower is to "gang" the mowers by staggering individual mowing elements in banks. Reel-type gang mowers have been popular over the years for mowing irregular contours and many are found on golf courses. The individual reel-type mowers in gang mowers are suspended from a common frame in staggered fashion for universally independent movement to achieve the desired contour mowing. Reel-type mowers, when used in gang mowers, are driven by their own independent wheels and do not require a separate source of power for the mower blade. The rotary blade type mower, because of its greater reliability and easier maintenance, has been found preferable in most applications to the reel-type mower, but it has not gained any significance or success in gang mowing devices because of the difficulties in driving the mower blade since no good way has been found to propel the rotary blade by the wheels.

It is a primary objective of the present invention to ameliorate the problems and deficiencies in prior mowing systems and to provide an improved rotary mower attachment for a small low profile lawn and garden tractor.

SUMMARY OF THE PRESENT INVENTION

In accordance with the present invention a rotary gang mower attachment having two spaced sets of rotary mower blades is provided to augment the cutting width of the standard mower of a lawn and garden tractor. The mower attachment includes an elongated frame that is pivotally connected to the drawbar of the tractor and carries at its rear end a pair of spaced wheels. The wheels are pivotally mounted on the frame by brackets and a pair of spaced parallel links interconnect these brackets with the drawbar of the tractor so that the wheels automatically steer and track the tractor during turning. This assures that the mower attachment will cut paths on each side of the path cut by the tractor mounted mower with a substantially constant overlap.

The mowers themselves are two banks of three rotary blades each pivotally supported about a horizontal axis on either side of the frame. Each of these mower assemblies is limited to pivotal movement about a single axially extending axis so that they may follow the irregular contour of the ground, but at the same time may be raised or lowered by the operator simply by moving the tractor drawbar up and down. The mower assemblies are supported by ground engaging rollers in the rear and at their front ends by cutter height guide wheels that determine the height of cut.

The mower assemblies, and more particularly their rotary blades, are driven by an internal combustion engine mounted centrally on the frame drivingly connected to the blades through a pulley and right angle drive system that articulates at the pivotal axis of each of the mower assemblies on the frame. This engine also drives a hydrostatic drive that is used to drive the standard mower attachment on the tractor so that the entire horsepower of the tractor can be used to provide greater tractive efforst to pull the mower attachment.

An important aspect of the present invention is the manner of raising and lowering the mower assemblies not only for purposes of transporting the attachment, but also to permit the mower assemblies to be raised individually to pass over an obstacle during the cutting operation. To accomplish this hydraulic actuators interconnect the frame with each of the mower assemblies. A primary directional control valve ports fluid to and from the actuators simultaneously to raise and lower the mower assemblies at the same time. Two secondary directional control valves control fluid flow to the actuators individually when it is desired to raise or lower one mower assembly without the other. The secondary directional control valves are isolated from the primary control valve when activated by a shuttle valve. Holding valves are associated with each of the hydraulic actuators to hold the mower assemblies in a raised position without creepage. Each of the mower assemblies is moveable to a substantially vertical position for transport and a cross-over bar mechanically interconnects the two in this position to provide a stable assembly during transport.

The pump associated with the hydrostatic transmission also provides hydraulic fluid under pressure for the hydraulic actuators that raise and lower the mower assemblies.

BRIEF DESCRIPTION OF THE DRAWINGS

FIG. 5 is a schematic view of the steering geometry of the present mower attachment on a turning tractor, and FIG. 6 is a hydraulic control circuit for the actuators that raise and lower the mower assemblies.

DETAILED DESCRIPTION OF THE PREFERRED EMBODIMENT

Figure 1:
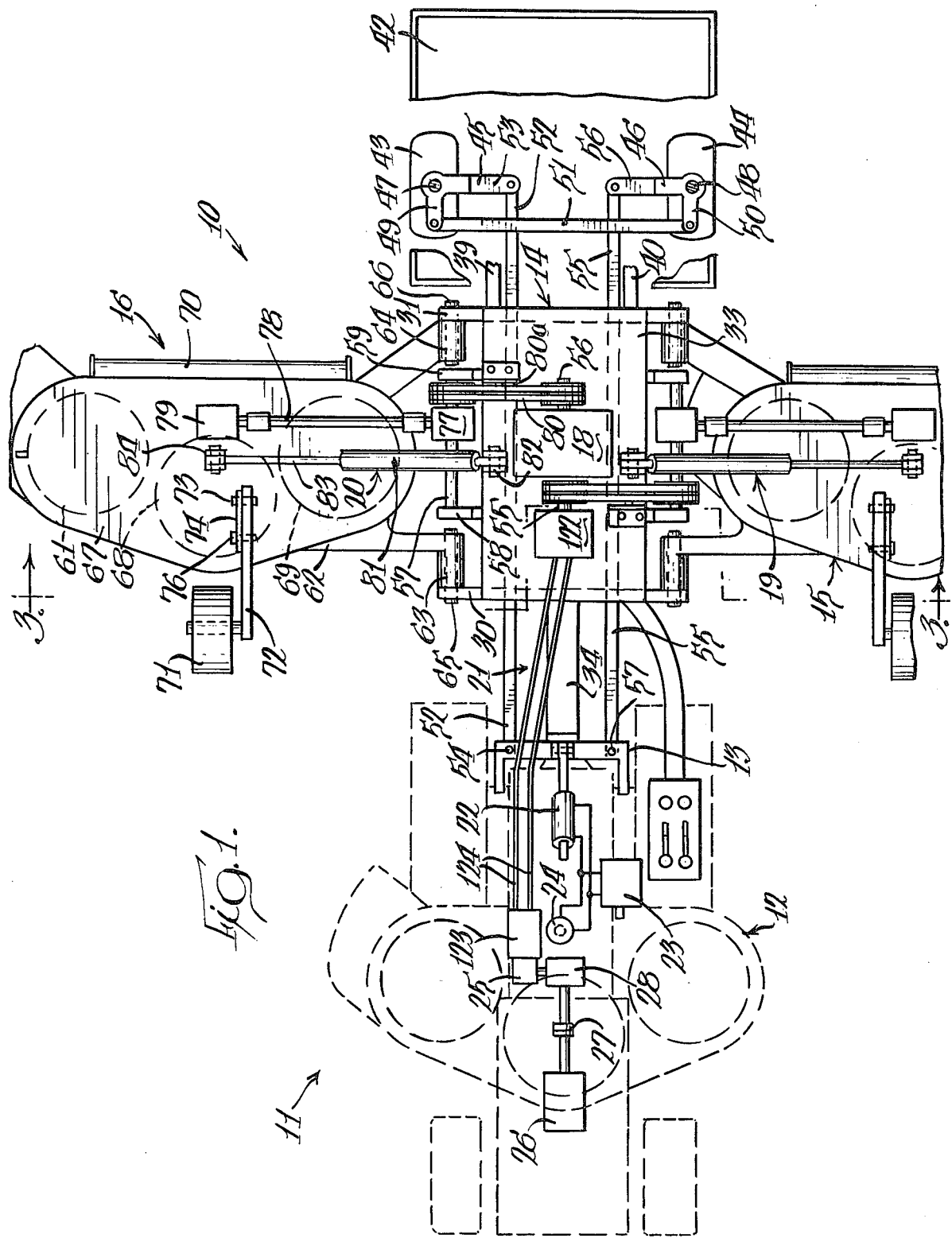
FIG. 1 is a plan view, partly broken away, showing the present mower attachment connected to the drawer of a lawn tractor having a conventional mower mounted on the underside of its frame.
Figure 2:
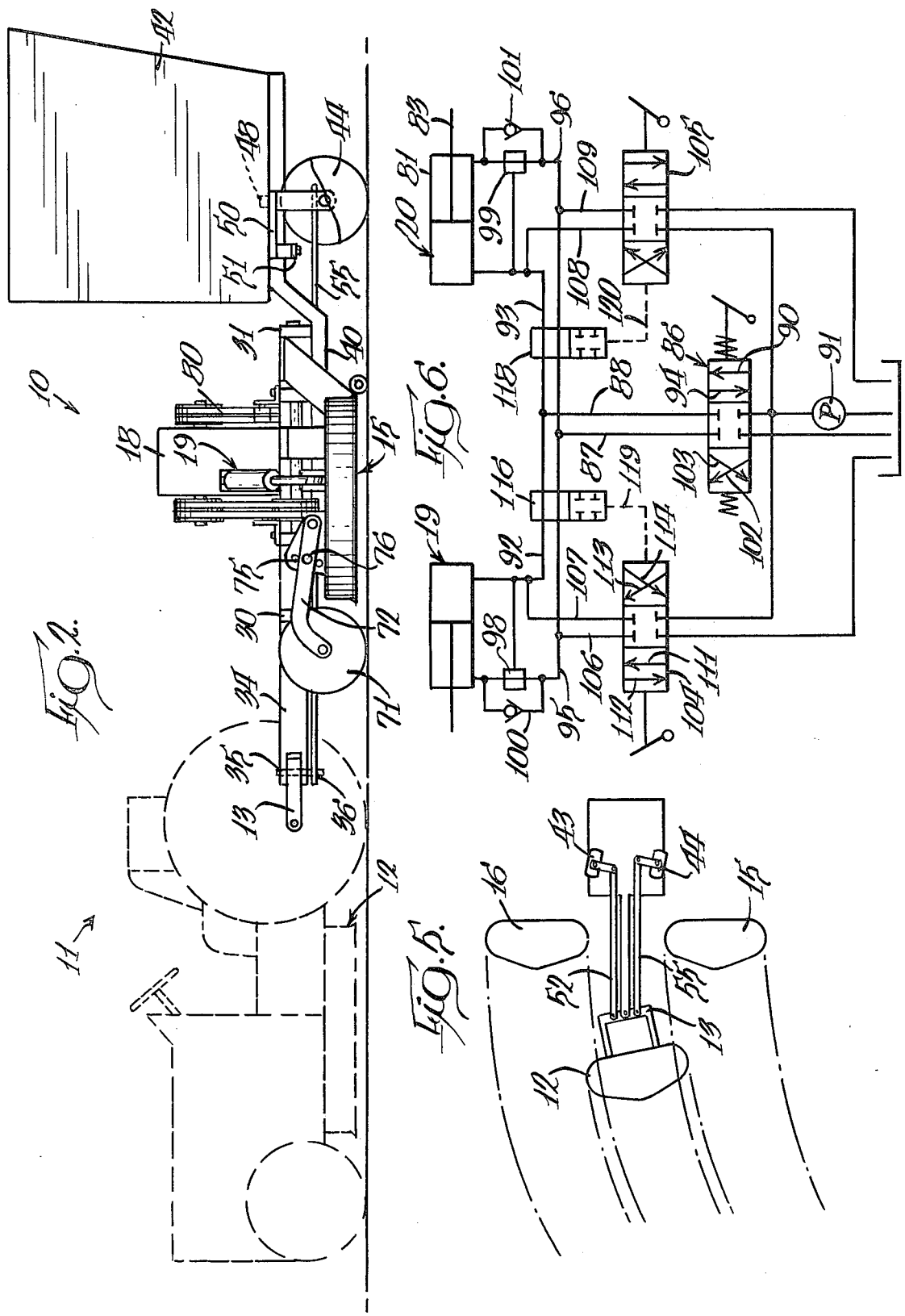
FIG. 2 is a side view of the mower attachment and tractor shown in FIG. 1.
Figure 3:
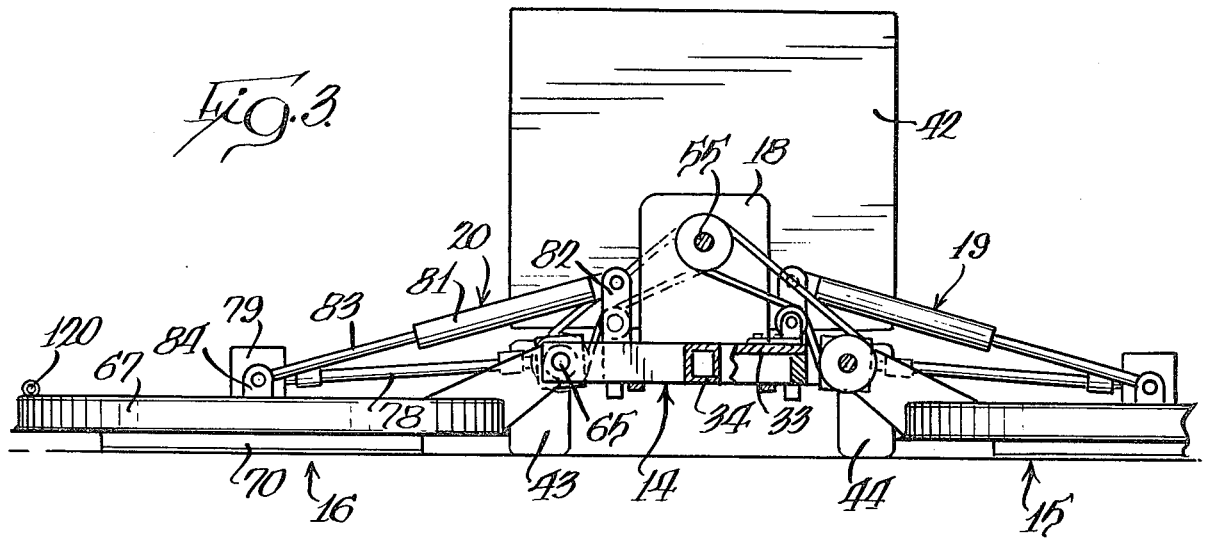
FIG. 3 is a front view, partly in section, of the mower attachment with the mower assemblies lowered without the front guide wheels.

Referring to the drawings and particularly FIGS. 1 and 2, a gang-type rotary grass mower attachment 10 as illustrated, pivotally mounted to the rear of a tractor 11 that has a standard rotary mower attachment 12 mounted on the underside of the frame of the tractor.

The mower 10 generally includes a frame 14 pivotally mounted to tractor drawbar 13 flanked by a left mower assembly 15 and a right mower assembly 16. The mower attachment 10 is designed so that the mower assembly 15 will just overlap the left side of the cut made by mower 12 while the mower assembly 16 will just overlap the right side of the cut made by the mower 12 both when the tractor 11 is straight tracking as well as turning.

An engine 18 is provided for driving the rotary blades of the mowers 15 and 16 and actuators 19 and 20 are provided for selectively raising and lowering the mower assemblies 15 and 16. A hydrostatic drive 21 is provided, driven by motor 18 for rotating the baldes of the tractor connected mower 12 to reduce the load on the tractor engine.

The drawbar 13 is pivotally mounted on the tractor frame and may be raised or lowered by an actuator 22 carried by the tractor and supplied fluid by a tractor mounted hydraulic pump 23 through a control valve 24. The blades of the tractor mower 12 are driven by a gear box 25 powered either by tractor engine 26 through clutch 27 when engaged and right angle drive 28, or alternatively by the hydrostatic drive 21 from the mower attachment engine 18 with clutch 27 disengaged.

The frame 14 includes space parallel frame bars 30 and 31 interconnected by a mounting plate 33. A tongue 34 is fixed to and projects forwardly from bar 30 and is bifurcated at its end, as shown in FIG. 2, forming boss members 35 and 36 that flank the drawbar and receive a suitable pin for pivotally interconnecting the mower attachment to the drawbar. As seen in FIGS. 1 and 2, a pair of support bars 39 and 40 project rearwardly from the frame member 31 and support a rectangular grass hopper 42 at the rear end of frame 11.

A pair of steerable wheels 43 and 44 are provided for supporting the frame 11 and assuring that the paths cut by the mower assemblies 15 and 16 properly follow and overlap the path cut by the tractor carried mower 12. Toward this end wheels 43 and 44 are supported by L-shaped brackets 45 and 46 that are pivotally connected at 47 and 48 to the frame members 39 and 40 respectively. The brackets 46 and 47 have forwardly extending projections 49 and 50 interconnected by a tie bar link 51 to assure coordinated movement of the wheels 43 and 44.

To steer the wheels 43 and 44 during turning of the tractor 11, a first bar or link 52 is provided pivotally connected at one end to an inward projection 53 carried by bracket 45 and at the other end pivotally connected at 54 to the right side of the drawbar 13. A second parallel link 55 is provided pivotally connected at its rear end to an inward projection 56 on bracket 46 and at its other end pivotally connected at 57 to the left side of drawbar 13. Thus, viewing the FIG. 1 geometry, as the drawbar 13 pivots counterclockwise wheels 43 and 44 will pivot clockwise and conversely when drawbar 13 pivots clockwise wheels 43 and 44 will pivot counterclockwise. This geometry, as seen in FIG. 5 in schematic form, prevents the mower attachment 10 from sagging to the inside of the turning radius of the tractor 11. It assures that the cuts made by the mower assemblies 15 and 16 will always overlap the cut made by the mower 12 even during turning.

The blades in the mower assemblies 15 and 16 are driven by the motor 18 mounted on frame plate 33. Mower assemblies 15 and 16 are mirror-image constructions of one another so that only mower assembly 16 will be described in detail. Mower assembly 16 includes a frame 62 having spaced axially aligned bosses 63 and 64 that are pivotally connected to frame members 30 and 31 by pins 65 and 66. This mounting arrangement permits only pivotal movement of the mower assembly 16 with respect to the frame 14 about a horizontal axis. In this manner as the drawbar 13 is raised or lowered the mower assemblies 15 and 16 and their cutting blades will be raised and lowered. The mower assembly frame 62 is fixed to a mower shroud 67 that has three rotary blades 61, 68 and 69 therein shown only in dotted lines in FIG. 1. The rear end of the shroud 67 carries an elongated ground engaging roller 70 that supports the mower assembly 16 and permits the mower assembly to follow the contour of the ground by pivoting about the horizontal axis of pivot bosses 63 and 64.

The forward end of the assembly 16 carries a guide wheel 17 that permits accurate adjustment of the cutting height of the blades 61, 68 and 69. Wheel 71 is rotatably supported on an arcuate bracket 72 pivoted at 73 on an upwardly extending flange 74 fixed to the top of the shroud 67 and having an arcuate slot 75 therein that receives a fastener 76 extending through the flange 74 to provide the necessary vertical adjustment for the wheel 71.

The mower assemblies 15 and 16 are driven by motor 18 through axially extending drive shafts 55 and 56 centrally disposed between the two mower assemblies. Since the drives between each of the mower assemblies 15 and 16 are the same, only the drive to mower 16 will be described in detail. Motor shaft 56 through belts 80 and 80a drives pulleys fixedly carried to shaft 57. The axis of shaft 57 is coincident with the pivotal axis of bosses 63 and 64 so that the drive to the mower blades is unaffected by pivotal movement of the mowe assembly frame 62.

Shaft 57 drives a right angle gear box 77 having an outwardly extending shaft 78 driving a right angle gear box 79 fixed to mower shroud 67. Suitable belting is provided between gear box 79 and blades 61, 68 and 69 for rotation thereof.

The actuators 19 and 20, in conjunction with the control circuit shown in FIG. 6 permit the mower assemblies 15 and 16 to be simultaneously raised and lowered in preparation for transport and use, or individually raised and lowered to permit one of the mower assemblies to pass over an obstruction in its path of travel while the remaining mowers continue to cut.

Only actuator 20 will be described since actuators 19 and 20 are identical. Actuator 20 includes a cylinder 81 pivotally connected to an upstanding boss 82 fixed to frame plate 33 carrying a piston with a projecting rod 83 pivotally connected to an upstanding boss 84 carried approximately centrally on the upper surface of the shroud 67.

As seen in FIG. 6, a primary directional control valve 86 is provided for porting fluid to the actuators 19 and 20 to achieve their simultaneous movement function. Valve 86 has a neutral position blocking flow in conduits 87 and 88 relative to the actuators 19 and 20. With valve 86 shifted to its left position the actuators 19 and 20 will be driven outwardly. In this position the valve ports fluid from pump 21 to conduit 88 through valve passage 90 pressurizing the head ends of the actuators 19 and 20 through lines 92 and 93 respectively. At the same time, fluid discharging from the rod ends of the actuators 19 and 20 passes to tank through lines 95, 96 and 87 and across valve passage 94 in primary directional control valve 86. When control valve 96 is shifted to its right position the actuators 19 and 20 will contract. In this position valve 96 ports fluid to rod ends of the actuators across valve passage 102, lines 87, 95 and 96, and discharges the head ends through lines 92, 93 and 88 across valve passage 103 to tank.

A holding valve 98 is provided in main line 95 and an indentical holding valve 99 is provided in main line 99 for preventing fluid flow from the rod ends of the cylinders except when the head ends of the cylinders are pressurized. This holds the mower assemblies in an elevated position without any creepage. Bypass check valves 100 and 101 permit free flow to the rod ends of the cylinders through conduits 95 and 96.

Two secondary directional control valves 104,105 are provided to individually control the actuators 19 and 20 independently of one another. Directional control valve 104 has outlet passages 106 and 107 connected respectively with main conduits 95 and 92, while control valve 105 has outlet passages 108 and 109 connected respectively with main conduits 92 and 96. When valve 104 is shifted to its right position, the head end of actuator 19 is pressurized and the right end discharged through valve passages 111 and 112 thereby extending actuator 19. Conversely, when 104 is shifted to its left position the rod end of actuator 19 will be pressurized across valve passage 113 and the head end discharged through valve passage 114 thereby contracting actuator 19. Control valve 105 operates in the same fashion with respect to the actuator 20 so that no further description is believed necessary.

The control valves 104 and 105 are arranged in parallel with the primary control valve 86 to achieve their independent operation. To isolate the control valve 86 from the control valves 104 and 105 during the independent operating modes, blocking shuttle valves 116 and 118 are provided. These shuttle valves are mechanically connected to their associated control valves by a cam and follower 119 and 120 so that regardless of which of the active positions the control valves 104 and 105 are placed, the shuttle valves 116 and 118 will move to their blocking positions. In the open position of control valve 116 shown in FIG. 6, free flow is permitted in both lines 92 and 95 associated with actuator 19. However, when the control valve 104 is shifted to either its right or left position, the shuttle 116 will shift upwardly from its position shown in FIG. 6 blocking all flow in lines 92 and 95 thereby isolating the control valve 86 from actuator 19 when operating in the independent mode. Shuttle valve 118 operates in the same manner with respect to control valve 105 in main lines 93 and 96 so that no further description thereof is believed necessary.

Figure 4:
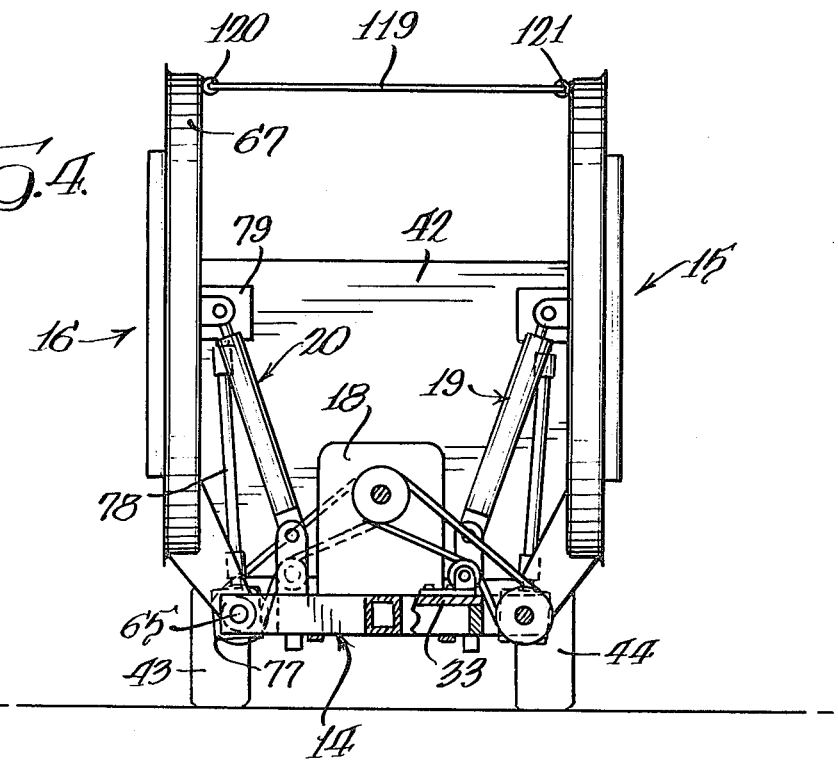
FIG. 4 is a front view of the present mower attachment similar to FIG. 3 but with the mower assemblies raised and the transport bracket in position.

As seen in FIG. 4, the mower assemblies 15 and 16 may be raised to a substantially vertical position to facilitate transport. While the holding valves 98 and 99 are capable of maintaining the position of the mower assemblies shown in FIG. 4, a cross bar 119 is provided that has hooked ends extending through eyelets 120 and 121 fixed to the topside of the mower shrouds 67 at their distal ends. This reduces the fatigue on the hydraulic components and also stabilizes the mower attachment 10 for transportation.

The hydrostatic 21 driven by motor 18 reduces the load on the tractor motor 26 by driving the tractor mounted motor 12 from the mower attachment engine 18. Toward this end, the hydrostatic drive 21 includes a pump 122 driven by motor shaft 55, mounted on the mower frame plate 33. Pump 122 delivers fluid to and receives fluid from a hydraulic motor 123 through suitable flexible conduits 124 abd 125. The pump 122 and motor 123 may be of the multiple axial piston type with fixed swash-plates. Motor 123 is selectively connectable to drive the tractor mower gear box 25 when clutch 27 is disengaged. The pump 122 may also be connected to supply hydraulic fluid under pressure to the actuators 19 and 20 rather than providing a separate pump 91 such as shown in FIG. 6 or using the hydraulic pump commonly associated with the tractor 11 for its standard attachments such as drawbar 13.

I claim:

1. A lawn mower attachment for a motor driven tractor having a drawbar, comprising; a central frame having a universal connection adapted to be connected to the drawbar, a power driven mower element connected to each side of the frame, each of said mower elements being pivotally mounted to the frame about spaced parallel horizontal axes extending in the direction of travel, wheel means for independently supporting each of said mower elements on the ground, two bracket means on the frame pivotally supporting a pair of wheels for pivotal movement about generally vertical axes, said wheels being positioned behind the power driven elements, a first link pivotally connected at one end to one of said bracket means and having pivotal connecting means at the other end adapted for connection to the tractor, and a second link pivotally connected at one end to other of said bracket means and having pivotal connecting means at the other end adapted for connection to the tractor whereby turning movement of the tractor will steer the wheels so that all of said mower elements track simultaneously with the central frame and the mower attachment tracks the tractor.

2. A lawn mower attachment for a motor driven tractor having a drawbar as defined in claim 1, wherein the first and second links are adapted to be pivotally connected to the tractor drawbar at spaced points, said first and second links being generally parallel to one and other.

3. A lawn mower attachment for a motor driven tractor having a drawbar as defined in claim 2, including a hopper mounted on the rear of the frame, said wheels extending beneath the hopper, a motor carried by the frame in front of the hopper and connected to drive said mower elements, said mower elements including a first mower element frame pivotally connected to said frame about a horizontal axis on one side of said frame, a second mower element frame pivotally connected to said frame about a horizontal axis on the other side of said frame, and means to selectively raise and lower the first and second mower element frames.

4. A lawn mower attachment for a tractor of the type having front and rear wheels and a rotary mower blade mounted between the front and rear wheels, comprising; a central frame having a universal pivotal connector at the forward end thereof adapted for connection with the tractor so that the tractor pulls the frame, unpowered wheel means supporting and mounted at the rear end of the frame, a first rotary mower element pivotally supported on one side of the frame about a horizontal axis generally parallel to the path of travel, a second rotary mower element pivotally supported on the other side of the frame about a horizontal axis generally parallel to the path of travel, so that the first and second mower elements will cut a path on both sides of the path cut by the tractor mounted mower blade, a motor unconnected to the wheel means carried by the frame means for driving both of the first and second mower elements, and separate drive means connecting said motor to drive each of the first and second mower elements.

5. A lawn mower attachment for a tractor of the type having front and rear wheels and a rotary mower blade mounted between the front and rear wheels as defined in claim 4, including means for selectively raising either of the first and second mower elements.

6. A lawn mower attachment for a tractor of the type having front and rear wheels and a rotary mower blade mounted between the front and rear wheels as defined in claim 5, wherein the means for selectively raising and lowering the first and second mower elements without disconnecting the separate drive means therefor includes a first hydraulic actuator pivotally connected at one end to the frame and the other end to the first mower element, a second hydraulic actuator pivotally connected at one end to the frame and the other end to the second mower element, and hydraulic control means for selectively porting fluid to the first and second hydraulic actuators.

7. A lawn mower attachment for a tractor of the type having front and rear wheels and a rotary mower blade mounted between the front and rear wheels as defined in claim 4, wherein the wheel means includes first and second wheels pivotally mounted at the rear of the frame, and means for automatically steering said wheels as the tractor turns.

8. A lawn mower attachment for a tractor of the type having front and rear wheels and a rotary mower blade mounted between the front and rear wheels as defined in claim 6, wherein the hydraulic control means includes holding valve means for blocking flow relative to first and second actuators when the actuators are in their raised positions.

9. A lawn mower attachment for a tractor of the type having front and rear wheels and a rotary mower blade mounted between the front and rear wheels as defined in claim 4, incluidng means driven by the motor for rotating the motor blade carried by the tractor.

10. A lawn mower attachment for a tractor of the type having front and rear wheels and a rotary mower blade mounted between the front and rear wheels as defined in claim 4, including a bracket for holding the mower elements in a substantially vertical position during transport.

11. A lawn mower attachment for a tractor of the type having front and rear wheels and a rotary mower blade mounted between the front and rear wheels, comprising; a central frame having a universal pivotal connector at the front end thereof adapted for connection with the tractor so that the tractor pulls the frame, unpowered wheel means supporting the rear end of the frame, a first rotary mower element pivotally supported about a horizontal axis extending in the path of travel on one side of the frame, a second rotary mower element pivotally supported about a horizontal axis extending in the path of travel on the other side of the frame so that the first and second mower elements will cut a path on both sides of the path cut by the tractor mounted mower blade, a first hydraulic actuator for raising and lowering the first mower element, a second hydraulic actuator for raising and lowering the second mower element, and hydraulic control means for selectively porting fluid to the first and second actuators to either simultaneously raise and lower the mower elements or to independently raise and lower the mower elements.

12. A lawn mower attachment for a tractor of the type having front and rear wheels and a rotary mower blade mounted between the front and rear wheels as defined in claim 11, including a first directional control valve having first and second positions conveying fluid simultaneously to opposite sides of the first and second actuators to raise and lower both of said first and second mower elements simultaneously, a second directional control valve for selectively porting fluid to the first hydraulic actuator independently of the first control valve, and a third directional control valve for selectively porting fluid to the second hydraulic actuator independently of the first directional control valve.

13. A mower attachment for a small tractor having a power drive mower blade, comprising; a mower, a central frame adapted to be pivotally attached to and pulled by the tractor, a universal connection at the forward end of the frame adapted to be connected to the tractor drawbar, unpowered wheel means supporting the rear end of the frame, a first mower element pivotally connected to one side of the frame, a second mower element pivotally connected to the other side of the frame, wheels supporting each of said mower elements, a motor mounted on the frame and drivingly connected to the mower elements, and drive means driven by the motor and connectable to the tractor mower blade to reduce the load on the tractor motor, said drive means including an input shaft adjacent and driven by the motor and an output shaft driven by the input shaft and spaced from the input shaft a distance therefrom further than the universal connector at the forward end of the frame is spaced from the input shaft.

14. A mower attachment for a small tractor having a power driven mower blade as defined in claim 13, wherein said drive means includes a hydraulic pump mounted on said frame and driven by said motor, and a hydraulic motor driven by the pump adapted to be mounted on the tractor to drive the tractor mower blade.

15. A mower attachment for a small tractor having a power driven mower blade as defined in claim 14, including first and second hydraulic actuators for raising and lowering said first and second mower elements, said pump being connected to supply fluid to said hydraulic actuators.

16. A mower attachment for a tractor having a tractor mounted mower and a drawbar, comprising; a mower central frame having a pivotal connector at the forward end thereof adapted for connection to the tractor drawbar, a first rotary mower element pivotally connected to the frame at one side thereof only about a horizontal axis, a second rotary mower element pivotally connected to the frame at the other side thereof only about a horizontal axis on the other side of the frame from the first mower element, wheel means supporting each of said mower elements, a motor on the frame drivingly connected to the mower elements, a first hydraulic actuator connected to the frame for raising and lowering the first mower element, a second hydraulic actuator connected to the frame for raising and lowering the second mower element, hydraulic control means for independently and simultaneously controlling the first and second hydraulic actuators, first and second spaced unpowered wheels for supporting the frame pivotally mounted at the rear end thereof, a first link connectable to the drawbar for pivoting the first wheel, a second link connectable to the drawbar for pivoting the second wheel, and drive means drivingly engaged by the motor to drive the tractor mounted mower.

* * * * *